United States Patent [19]
Kono et al.

[11] Patent Number: 5,841,883
[45] Date of Patent: Nov. 24, 1998

[54] METHOD OF DIAGNOSING A PLANT AUTOMATICALLY AND DEVICE FOR EXECUTING METHOD THEREOF

[75] Inventors: Yasushi Kono; Keiko Kobayashi, both of Susono, Japan

[73] Assignee: Yazaki Corporation, Tokyo, Japan

[21] Appl. No.: 549,207

[22] Filed: Oct. 27, 1995

[30] Foreign Application Priority Data

Oct. 27, 1994 [JP] Japan ................... 6-263359

[51] Int. Cl.⁶ ....................................... G06K 9/00
[52] U.S. Cl. ..................... 382/110; 382/164; 382/165
[58] Field of Search ........................... 382/110, 165, 382/164, 168; 348/143, 144

[56] References Cited

U.S. PATENT DOCUMENTS

| | | | |
|---|---|---|---|
| 5,206,918 | 4/1993 | Levene | 382/110 |
| 5,253,302 | 10/1993 | Massen | 382/1 |
| 5,546,475 | 8/1996 | Bolle et al. | 382/110 |

FOREIGN PATENT DOCUMENTS

| | | |
|---|---|---|
| 0 267 860 A2 | 5/1988 | European Pat. Off. . |
| 57-144451 | 9/1982 | Japan . |
| 62-295190 | 12/1987 | Japan . |
| 3-504424 | 9/1991 | Japan . |
| 07115846 | 5/1995 | Japan . |
| WO 90/14635 | 11/1990 | WIPO . |

OTHER PUBLICATIONS

PLA et al., "Colour Segmentation based on a Light Reflection Model to Locate Citrus Fruits for Robotic Harvesting"; Computers and Electronics in Agriculture, vol. 9, No. 1, 1993, pp. 53–70, XP–002066236.

Blazquez et al., "Image Analysis of Tomato Leaves with Late Blight", Journal of Imaging Technology, vol. 11, No. 3, 1985, pp. 109–112, XP–002066237.

*Primary Examiner*—Jose L. Couso
*Assistant Examiner*—Matthew C. Bella
*Attorney, Agent, or Firm*—Oblon, Spivak, McClelland, Maier & Neustadt, P.C.

[57] ABSTRACT

An automatic plant diagnostic device and method are provided to inform disease conditions of the plant easily and early. An image memory of the device reads a color image of a plant and controls a display so as to display the image. An background color deleting unit deletes the background color from the color image on display, so that a leaf image can be obtained. A color change calculating unit detects values corresponding to hues of the leaf image and stores them in a memory on every date. After storing, the calculating unit further allows the display to display the values of hues on every date in form of a graph.

12 Claims, 15 Drawing Sheets

FIG.6

ANALYSIS RESULT

| DIGITIZATION (WHOLE LEAF) | DIGITIZATION (SICK SPOTS) | DIGITIZATION (EXCEPT SICK SPOTS) |

MEAN
R ☐
G ☐
B ☐
V ☐
COUNT ☐

MEAN
R ☐
G ☐
B ☐
V ☐
COUNT ☐

MEAN
R ☐
G ☐
B ☐
V ☐
COUNT ☐

CHANGES OF R.G.B. ON LEAF (Mn DEFICIENCY)

CHANGES OF R.G.B. ON LEAF (Fe DEFICIENCY)

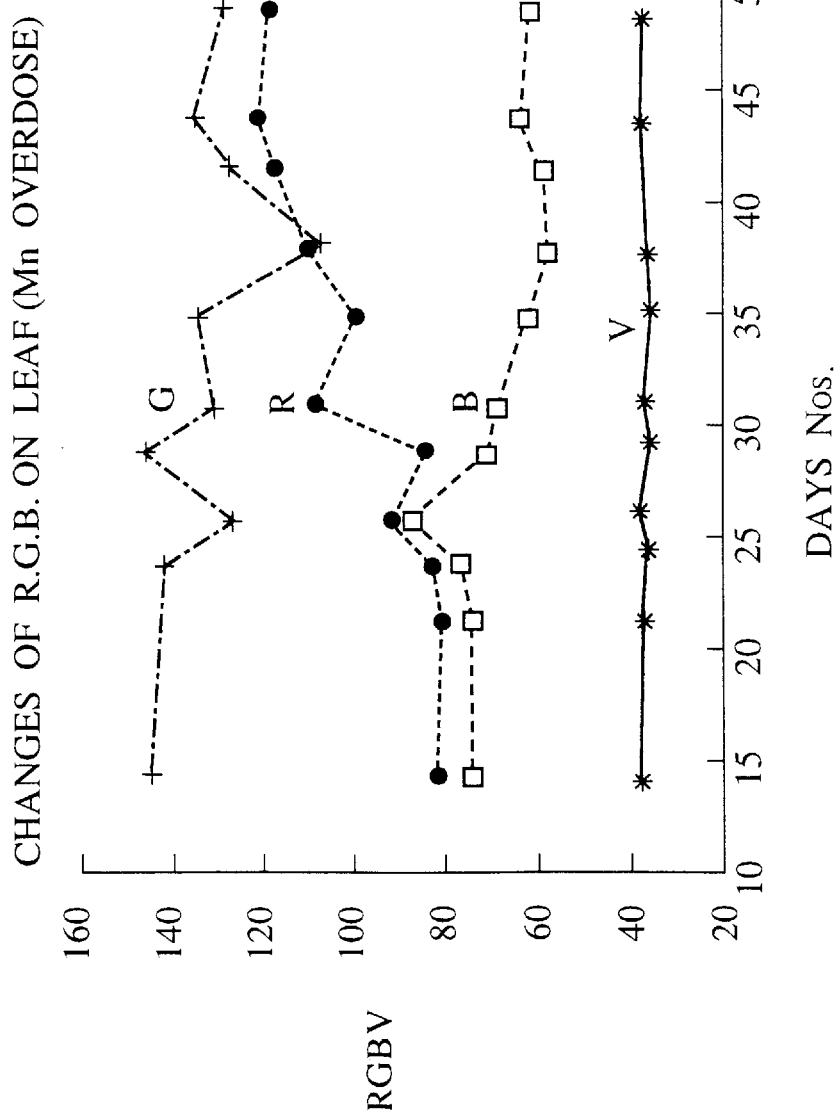

FIG.11

ANALYSIS RESULT

| DIGITIZATION (WHOLE LEAF) | DIGITIZATION (SICK SPOTS) | DIGITIZATION (EXCEPT SICK SPOTS) |
|---|---|---|
| MEAN | MEAN | MEAN |
| R ☐ | R ☐ | R ☐ |
| G ☐ | G ☐ | G ☐ |
| B ☐ | B ☐ | B ☐ |
| V ☐ | V ☐ | V ☐ |
| COUNT ☐ | COUNT ☐ | COUNT ☐ |

RATIO OF LEAF FACE TO SICK SPOTS

☐ %

METHOD OF DIAGNOSING A PLANT AUTOMATICALLY AND DEVICE FOR EXECUTING METHOD THEREOF

BACKGROUND OF THE INVENTION

The present invention relates to an automatic plant diagnostic device and a method of diagnosing a plant automatically and, more particularly, it relates to an automatic diagnostic device for indicating changes in colors of the plant automatically and a method of diagnosing the changes.

In general, it is known that damage to a plant, which may be caused by a lack or overcharge of fertilizer elements (e.g. manganese, calcium, magnesium etc.), result from one lacking or overcharged element to another element in terms of conditions of disease, such as sorts of fading in the plant, a position of the fading in the whole plant and the leaf or the like.

For example, if iron-deficiency disease is caused in a tomato plant, the color of the upper leaves would be changed from green to light green in its early stage, with remaining green veins in the leaves. Thereafter, the color of the whole portion of the individual leaf would be turned to light yellowish-green in the course of time.

It is also known that, in the case of magnesium-deficiency disease, a color of the whole leaf gradually changes from green to light green, so that the white necrosis may arise in portions among veins of the lower leaves. Also regarding the leaves in the vicinity of fruits, the color of portions among the leaf veins will be changed to yellow, so that brown sick spots may be produced in places. In such a case, the plant will be dead finally.

In the case of manganese-overdose disease, the veins of the lower leaves will be chocolate-colored while tiny sick spots will be produced in portions among the veins, being chocolate-colored.

In order to detect the above-mentioned sick conditions in their early stages, it has been required to keep observing the plant and to judge what deficiency in elements is arising in the plant.

In order to diagnose the plant by the observation, however, sufficient knowledge of diseases for respective kinds of plants and many years' experience are required for the observer. In addition, it should be noted that, due to the diagnosis by human eyes, the damage has already progressed considerably by the time a change of color can be identified fairly.

In conclusion, under the present circumstances, it is practically difficult to detect the disease of the plant in its early stages and to take measures thereof.

SUMMARY OF THE INVENTION

It is, therefore, an object of the present invention to provide an automatic plant diagnostic device which is capable of recognizing disease conditions of the plant easily and early.

The object of the present invention described above can be accomplished by an automatic plant diagnostic method comprising the steps of:

reading a color image of a plant to be taken and subsequently extracting a leaf image thereof from the color image of the plant;

counting numbers of colors of each of a plurality of picture elements forming the leaf image extracted in sequence and accumulating the numbers of colors;

processing the accumulated numbers of colors by total numbers of the picture elements thereby to obtain hues of the leaf and subsequently storing the hues in correspondence with a time when the extracting step is executed; and displaying both the hues stored at this time and other hues stored in the past in a first display form.

In the above mentioned method, the leaf image is extracted from the color image of the object. Then, the numbers of respective color values of each picture element forming the leaf image are detected, whereby the hues are detected on a basis of total numbers of the whole leaf. The hues obtained in this way are stored in correspondence with the times for extracting and both the hues stored at this time and other hues stored in the past are displayed in the first display form, such as a graph.

According to the present invention, there is also provided an automatic plant diagnostic method comprising steps of:

reading a color image of a plant to be taken and subsequently extracting a leaf image thereof from the color image of the plant;

counting numbers of colors of each picture element forming the leaf image extracted in sequence and accumulating the numbers of colors;

processing the accumulated numbers of colors by total numbers of the picture elements thereby to obtain hues of the leaf and subsequently storing the hues in correspondence with a time when the extracting step is executed;

further extracting an image of normal portions of the leaf and an image of sick spotted portions thereof when the color image is read;

calculating an area ratio of the normal portions to the sick spotted portions by respective numbers of picture elements contained in the normal portions and the sick spotted portions and subsequently storing the area ratio in correspondence with the time; and displaying both the hues stored at this time and other hues stored in the past in a second display form and displaying both the area ratio stored at this time and another area ratio stored in the past in the second display form.

In the above mentioned method, the hues of the leaf are detected from the color image of the object to be detected and stored in correspondence with the times for extracting. Further, the sick spotted portions and the normal portions of the plant are extracted and their areas are calculated by respective numbers of picture elements contained in the portions. Thereafter, the area ratio of the normal portions to the sick spotted portions is calculated and stored in correspondence with the extracting times. Respectively displayed in the second display form, such as a graph, are both the hues stored at this time and another hues which was stored in the past and both the area ratio stored at this time and another area ratio which was stored in the past.

According to the present invention, there is also provided an automatic plant diagnostic device comprising:

a manipulating unit manipulated by an operator;

a display;

an image memory for reading color image data of a plant and storing the color image data every taking date, the image memory subsequently reading the color image data on every taking date and converting the color image data into color video signals thereby allowing the display to display the color image;

a background color deleting unit for deleting background colors of the color image by subtracting three established primary colors from the color image displayed on the display thereby obtaining a leaf image of the plant;

a color-change calculating unit for measuring both three primary colors values and lightness values of each picture element forming the leaf image when it is commanded to detect hues of the leaf image and subsequently averaging the three primary colors values and the lightness values by numbers of the picture elements, the calculating unit further storing respective means of the values as parameters representing the hues on every taking date, and making graphs on a basis of the respective means thereby to output graph signals to the display;

a mode judgement unit having respective judgement data stored therein, the mode judgement unit activating the image memory, the background color deleting unit and the color-change calculating unit on a basis of the respective judgement data when the manipulating unit is operated.

In the above mentioned automatic plant diagnostic device, the image memory reads the color image of the object and allows the display to display. Next, the leaf image can be obtained by deleting the background color from the color image of the object in which the background color to be deleted is display. When it is commanded to detect hues of the leaf image, the total numbers of picture elements forming the sick spotted portions and respective distribution numbers in three primary colors and lightness value of each of said picture elements are calculated by the color-change calculating unit, so that the respective means of the three primary colors and lightness values are stored as numerical values representing hues of the leaf on every date, whereby the graph showing the numerical values is made and displayed.

The nature, principle, and utility of the invention will become more apparent from the following detailed description when read in conjunction with the accompanying drawings.

DESCRIPTION OF THE DRAWINGS

In the Accompanying Drawings:

FIG. 6 is an explanatory diagram showing an example of an "analysis result" picture of the first embodiment;

FIG. 8 is a graph showing color changes of a tomato plant in Mn overdose;

FIG. 11 is an explanatory diagram showing an example of an "analysis result" picture of the second embodiment;

DESCRIPTION OF THE PREFERRED EMBODIMENT

A variety of embodiments of the present invention will be described with reference to the drawings.

A First Embodiment

Figure 1:
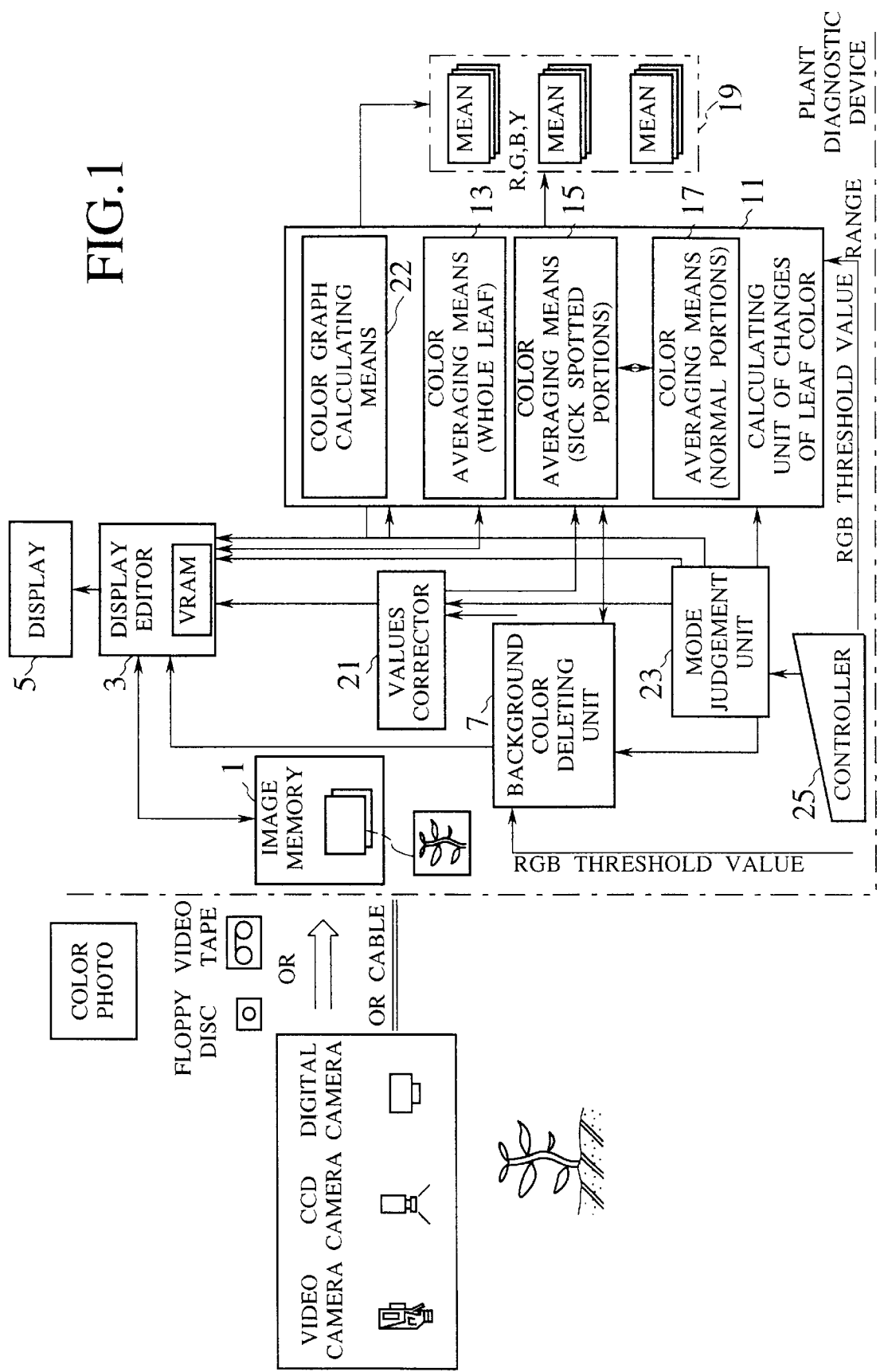
FIG. 1 is a block diagram showing a general structure of an automatic plant diagnostic device in accordance with a first embodiment of the present invention.

FIG. 1 shows a general structure of an automatic plant diagnostic device in accordance with the first embodiment of the present invention. In the figure, reference numeral 1 designates an image memory. The image memory I operates to read data of color images stored in recording media, such as color photographs, floppy discs, video tapes or the like, and outputs the read data to a display editor 3.

Further, when the image memory 1 is connected to a CCD camera, the memory 1 also converts color-video signals from the camera into digital signals and outputs the digital signals to the display editor 3. To the image memory 1, a not-shown keyboard is connected to allow a display 5 of the diagnostic device to display an image and to enlarge or reduce the image by an operator's clicking on a portion of the image for displaying the respective R.G.B. (red, green, blue) values of the portion Stored in the display editor 3 is various information for producing at least "collect menu for recognition data on leaf face," which is described later, a picture of "deletion of background color" and a picture of "analysis of sick spots on leaf face." Providing that the picture "deletion of background color" is now on the display 5 and if the respective R.G.B. values are inputted, the editor 3 causes the display 5 to display the inputted R.G.B. values in predetermined portions of VRAM therein. Meanwhile, if it is commanded to execute a deletion of the background, the editor 3 allows the display 5 to change an image from the present picture of "deletion of background color" into the image that the image memory I has read and then, the editor 3 controls the display 5 in accordance with indications transmitted from a background color deleting unit 7.

When the end signal of sick spotted extraction is selected in displaying the picture for analyzing sick spots on the leaf, the editor 3 operates to allow the display 5 to display an image to be controlled by color averaging means described later. Meanwhile, when it is commanded to display an image of analysis results of sick spotted portions, the editor 3 causes the display 5 to display the analysis results image. In addition, in case that an item of "quit" is selected or a cancel key on the keyboard is pressed down, the analysis image of leaf sick spots is displayed by the editor 3.

Furthermore, lightness values (V) are so controlled as to be a constant, usually by a values corrector, which is described later. The plant diagnostic device of the embodiment has functions of enlarging the plant image on display, reducing it, extracting it and adjusting the values of image. Note that, in the embodiment, the above mentioned displaying operation is carried out once all information necessary for the image has been entered in VRAM in the editor 3.

Reference numeral 7 denotes an unit for deleting background colors of the image, which will be also referred hereinafter as "background color deleting unit." The background color deleting unit 7 can start to operate by an input for indicating to delete the background colors and control the display editor 3 so as to allow the display 5 to display a set-up picture for background colors deletion modes. If a set-up mode of R.G.B. threshold values is selected from the picture for deleting the background colors and when R.G.B. values are inputted respectively, the unit 7 outputs the R.G.B. values to the display editor 3 to set them in an inside register. On the other hand, when it is selected to execute the above set-up picture for background colors deletion modes, the unit 7 operates to input one image of the plant from the image memory I and outputs an image, which has been obtained by subtracting the set-up R.G.B values, to the display editor 3, every picture element of the image inputted.

Reference numeral 11 designates an unit for calculating changes of leaf color, which will be also referred hereinafter as "leaf color-change calculating unit." The leaf color-change calculating unit 11 comprises total color averaging means 13 for averaging color of the whole leaf face, sick-spotted portions' color averaging means 15 for averaging color of the sick-spotted portions of the leaf face, normal portions' color averaging means 17 for averaging color of the normal portions and color graph calculating means 22. The unit 11 starts to operate when an indication signal for analyzing the sickness of a leaf face is inputted and controls the display editor 3 so as to allow the display 5 to display a picture for analyzing the sick spots.

The total color averaging means 13 serves to count the respective numbers of R.G.B. of the leaf face image at every picture element from a VRAM of the display editor 3. When the counting operation of the R.G.B. numbers over all of the leaf face is accomplished, it averages the R.G.B. numbers counted, based on the numbers of picture elements and then stores the average color (mean) in a memory 19 as a hue of the whole leaf.

In operation, the sick-spotted portions' color averaging means 15 reads respective ranges of R.G.B. threshold values for extracting the sick spotted portions inputted. Further, the means 15 counts the R.G.B. values in the respective ranges of R.G.B. threshold values from the leaf image in the VRAM of the display editor 3 and averages the R.G.B. values on a basis of the numbers of picture elements contained in the sick spotted portions thereby to store the averaged values in the memory 19 as a hue of the sick spotted portions.

The normal portions' color averaging means 17 counts and averages the R.G.B. values out of the respective ranges of R.G.B. threshold values from the leaf image and then, stores the averaged values in the memory 19 as a hue of the normal portions.

In addition, the above mentioned averaging means 13, 15 and 17 operate to count lightness values V of each picture element and stores them in the memory 19.

Reference numeral 21 denotes a values corrector in which the standard lightness values of the plant are stored in advance. The values corrector 21 operates to correct the detected values V so as to be the standard lightness values usually.

In operation, the above mentioned color graph calculating means 22 reads a numerical hue value in the memory 19 of each date of months and controls the display editor 3 to let the display 5 display graphs on which the respective hue values are plotted corresponding to an axis of numbers of dates and another axis of RGBV.

Reference numeral 23 denotes a mode judgment unit which allows the above mentioned units 7, 11, 21 and the display editor 3 to bring into activated condition by inputting a signal from a controller 25. For example, the unit 23 outputs command signals to cause the display editor 3 to display the menu of leaf face recognition data and to allow the background color deleting unit 7 to operate.

Figure 2:
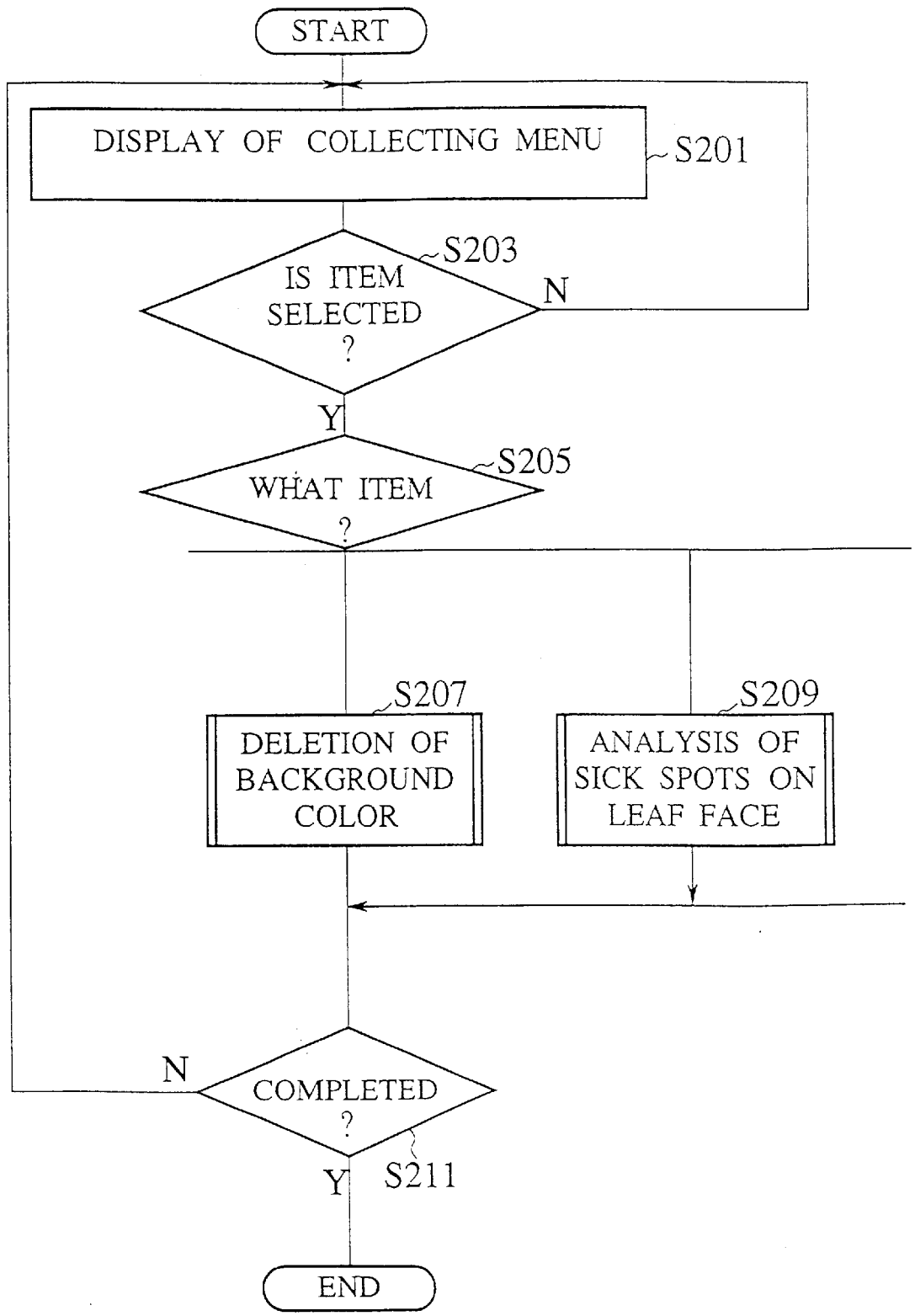
FIG. 2 is a flow chart to execute an operation of a mode judgement unit of FIG. 1.

We now describe operations of the above mentioned plant diagnostic device. FIG. 2 is a flow chart of an operation of the mode judgement unit 23 while FIG. 3 is an explanatory diagram of pictures on display in accordance with the first embodiment.

Figure 3:
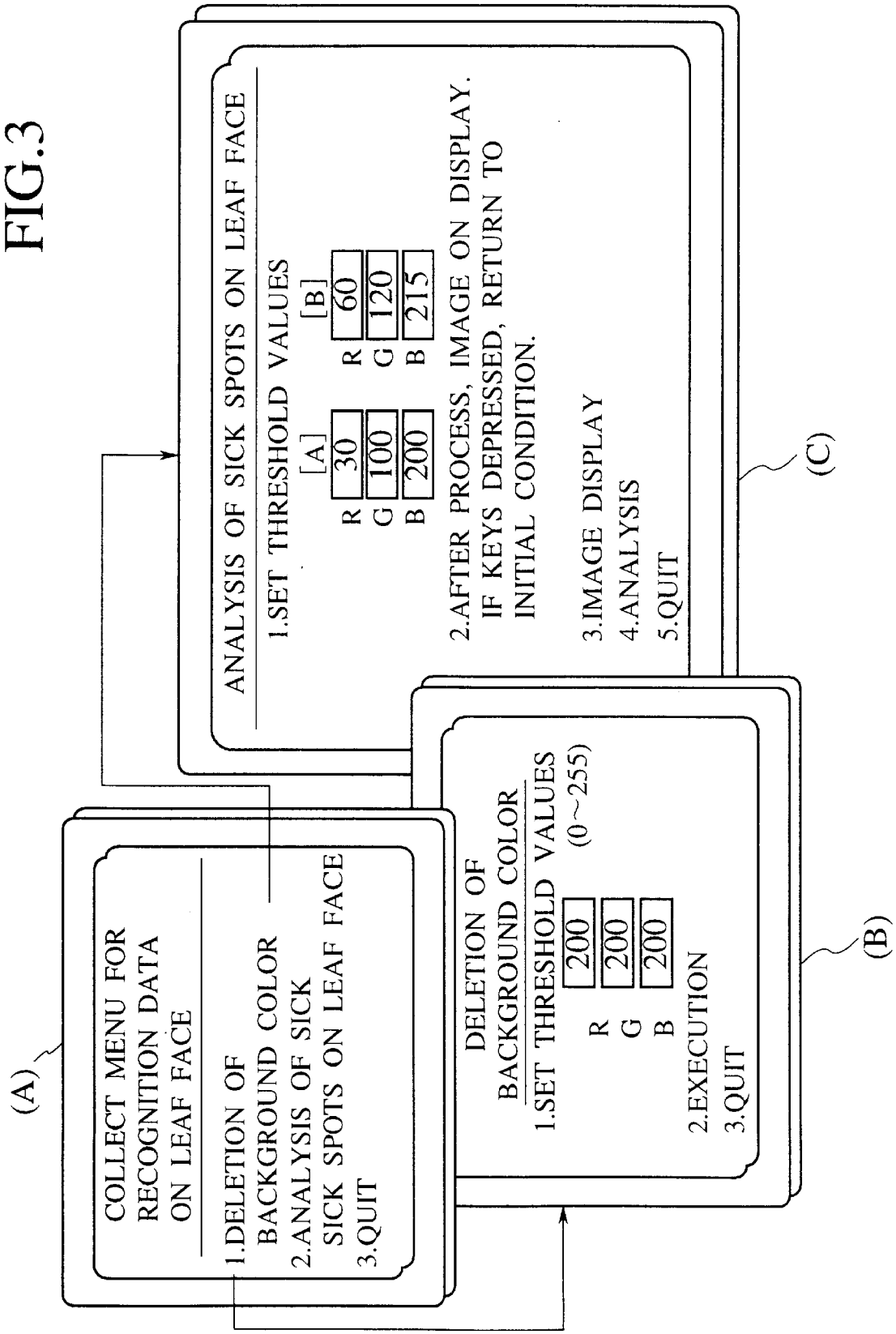
FIG. 3 is an explanatory diagram showing display pictures of the first embodiment.

After checking the respective units with the power supply, a program of the invention stored in ROM is loaded into RAM and the mode judgement unit 23 controls the display editor 3 so as to allow the display 5 to display the picture of "collect menu for recognition data on leaf face" shown with (A) of FIG. 3 (step S201).

At step S203, by the mode judgement unit 23, it is judged whether or not either one of the items "deletion of background color" or "analysis of sick spots on leaf face" as shown in FIG. 3 is selected. If one item is selected, the routine goes to step S205 where it is judged which of the items is selected. At step S205, if it is judged that the item of "deletion of background color" is selected, the routine goes to step S207 where a picture of "deletion of background color" shown with (B) of FIG. 3 is displayed and the background-color deleting unit 7 is activated. On the other hand, when the item of "analysis of sick spots on leaf face" is selected, the routine goes to step S209 where a picture of "analysis of sick spots on leaf face" shown with (C) of FIG. 3 is displayed and the calculating unit 11 is activated.

At subsequent step S211, it is judged whether predetermined processes to be executed at step S207 or step S209 described later has been completed. If the judgement at step S211 is "No," the routine returns to step S201.

Figure 4:
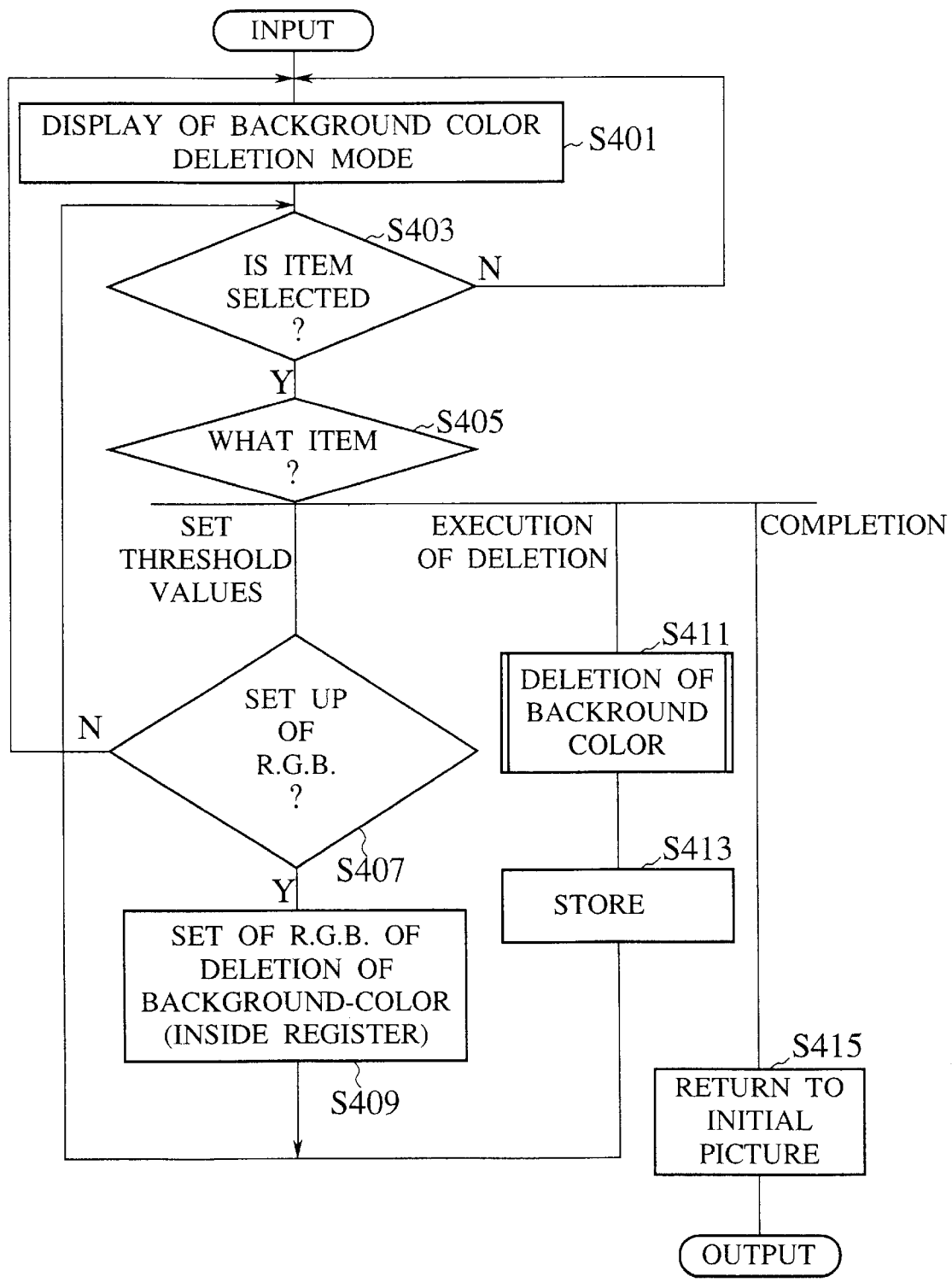
FIG. 4 is a flow chart to execute an operation of a background color deleting unit of FIG. 1.

FIG. 4 is a flow chart of operations of the background color deleting unit 7.

In an activated condition, the unit 7 controls the display editor 3 so as to allow the display 5 to display the picture of background color deletion mode shown with (B) of FIG. 3 at step S401. Then, at step S403, it is judged whether either the item of "set threshold values" or the item of "execution of deleting background color" as shown with (B) of FIG. 3 is selected. If the item is selected, the routine goes to step S405 where it is judged what item is selected. At step S405, when it is judged that the item of "set threshold values" of R.G.B. for deleting the background-color is selected, the routine goes to step S407. At step S407, it is judged whether or not the R.G.B. threshold values are inputted. When the judgement at this step is "Yes," the routine goes to step S409 where the R.G.B. values are established as the R.G.B threshold values for deleting the background-color.

Regarding the R.G.B. threshold values for deleting the background-color, it should be noted that, in case that the green is blackish (dark) green, the R.G.B. threshold values will be smaller than the respective R.G.B. values of a green face of the plant to be detected. On the contrary, in case that the green is whitish (light) green, the R.G.B. threshold values will be larger than the respective R.G.B. values of the green face, respectively. Prior to use of the present device, R.G.B. maps, which represent the above relationships of the R.G.B. value in response to kinds of plants, will be supplied to a user for reference of the R.G.B. values in deleting the background-color.

Returning to FIG. 4, when an execution of process to delete the background color shown with (B) of FIG. 3 is selected, the routine goes to step S411 where the background color deleting process is executed in which the unit 7 operates to subtract the established R.G.B. threshold values from a color image that the image memory 1 has read, thereby obtaining an image of the leaf face only. At subsequent step S413, color images of leaf obtained in the above way are stored every time, day, month and year and the leaf color images are entered in VRAM of the display editor 3 to display them. After completing the process, the routine returns to step S403.

On the contrary, if the item of "quit" in the picture (B) of FIG. 3 is selected, then the routine goes to step S415 where a process to return to the initial picture (A) of the FIG. 3 is executed, so that the routine is ended.

Figure 5:
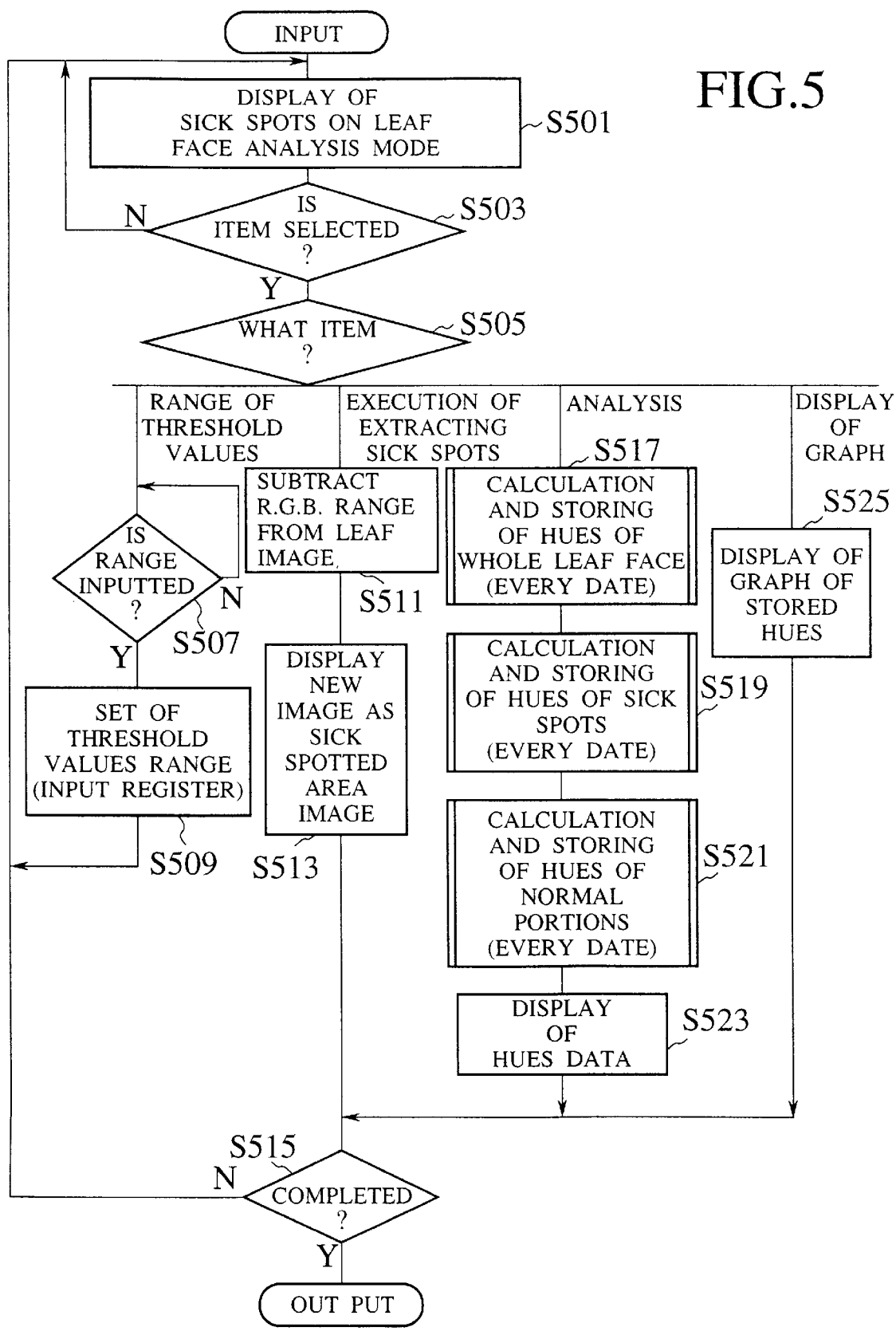
FIG. 5 is a flow chart to execute an operation of a "changes in leaf color" calculating unit of FIG. 1.

FIG. 5 is a flow chart of operations of the leaf color-change calculating unit 11.

When activated, the unit 7 controls the display editor 3 so as to allow the display 5 to display the picture of "analysis of sick spots on leaf face" shown with (C) of FIG, 3 at step S501. Then, at step S503, it is judged whether either one of the items in the picture is selected. If any item is selected, the routine goes to step S505 where it is detected what item of the picture is selected. At step S505, when it is judged that the item "set of R.G.B. threshold values ranges" is selected, the routine goes to step S507. At step S507, it is judged whether or not the R.G.B. threshold values ranges are inputted. When the judgement at this step is "Yes," the routine goes to step S509 where the color averaging means 15 for the sick spotted portions operate to set up the respective ranges of the R.G.B. threshold values in the inside register and, thereafter, the routine returns to step S501.

If the item of "execution of sick spots extraction" is selected, the routine goes to step S511 where the color averaging means 15 reads the color image of leaf face from VRAM of the display editor 3 and subtracts the established R.G.B. threshold values ranges from the color image. At subsequent step S513, the resulting image is displayed as the image of sick spotted portions and the routine goes to step S515.

At step S515, it is judged whether the above process is completed. When the judgement is "Yes," the routine returns to step 501.

When the item of "analysis of sick spots" is selected in the picture (C) of FIG. 3, the routine goes to step S517 where hues of the whole leaf face are calculated and stored every day, month and year by the total color averaging means 13. This calculation of hues of the whole leaf can be carried out by counting both R.G.B. values and lightness values V of all picture elements of the image on display and subsequently dividing the resulting count values by total numbers of the picture elements.

Next, at step S519, the hues of sick spotted portions arc calculated by the sick-spotted portions' color averaging means 15 and stored therein every day, month and year. In order to calculate the hues of sick spotted portions, the R.G.B. values in the established R.G.B. threshold values ranges are firstly subtracted from the picture elements of the leaf face. Then, the dot-number of the resulting R.G.B. values is divided by the total numbers of the picture elements, so that respective means (average) of R.G.B of the sick spotted portions can be obtained. These means are stored every day, month and year, as "the sick spotted portions' hue." Further, at step S519, the lightness values (V) are also counted and then stored every day, month and year.

Next, at step S521, hues of the normal portions on the leaf face are calculated and stored every day, month and year by the normal portions' color averaging means 17. In order to calculate hues of the normal portions, the R.G.B. values out of the established R.G.B. threshold values ranges are respectively subtracted from the picture elements on the leaf face. Then, the dot-number of the resulting R.G.B. values is divided by the total numbers of the picture elements, so that respective means (average) of R.G.B of the normal portions can be obtained. These means are then stored every date, month and year, as "the normal portions' hue". Further, at this step S521, the lightness values (V) are also counted and then stored every day, month and year.

At subsequent step S523, the respective hues obtained in this way are displayed by numerals as shown in FIG. 6 and thereafter, the routine returns to step S515.

Figure 7A:
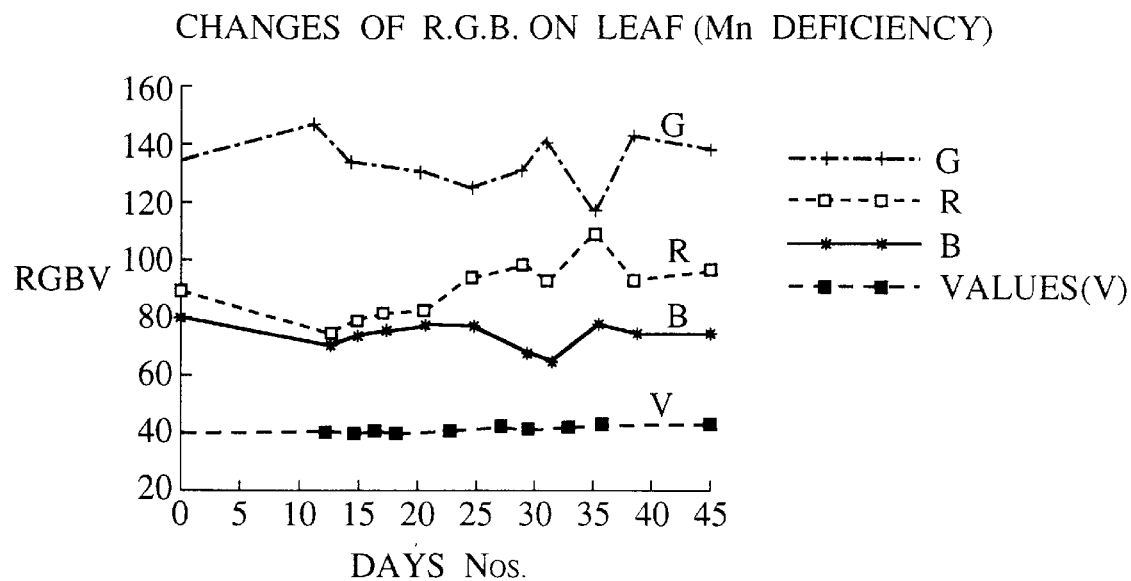
FIGS. 7A and 7B are graphs showing color changes of a tomato plant with Mn deficiency and Fe deficiency, respectively.
Figure 7B:
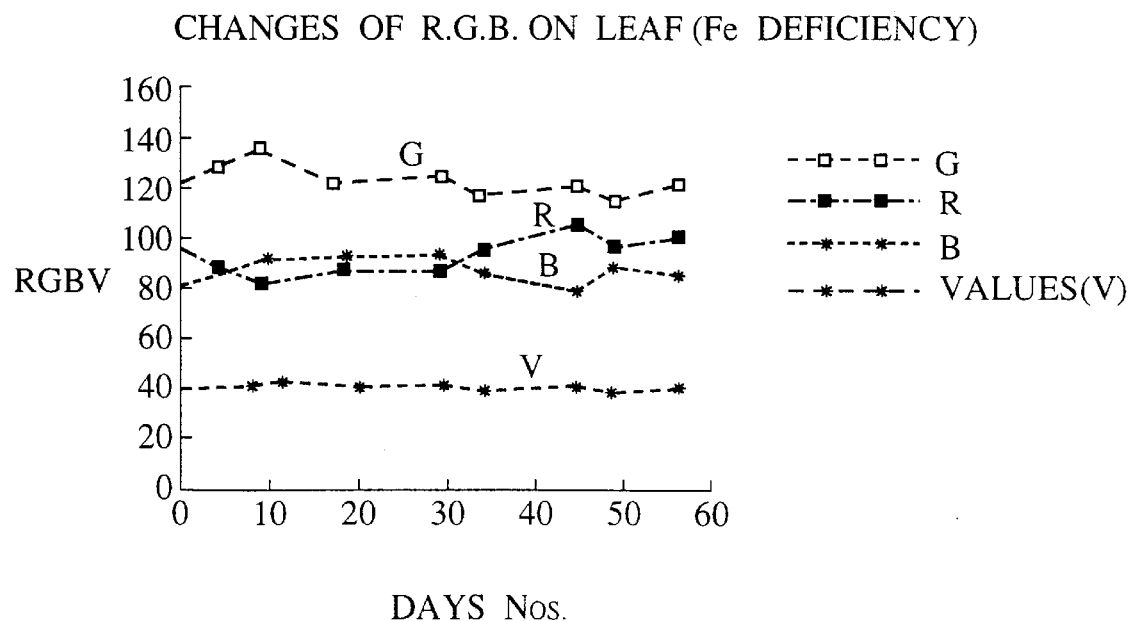

Returning to step S505, when the item of "display of graph" is selected, the routine goes to step S525 where the color graph calculating means 22 calculates respective averages of RGBV representing the hues stored on every plural days and allows the display 5 to display graphs as shown in FIGS. 7A, 7B and 8, based on a graph displaying program. That is, according to the embodiment, it is possible to express the changes in hues of leaf face corresponding to numbers of passing dates, in form of diagrams of RGBV as shown in FIGS. 7A, 7B and 8.

We now describe the diagrams of FIGS. 7A, 7B and 8.

It is known that changes in colors of the leaves indicate symptoms of plant-disease. For example, manganese-deficiency disease in a tomato plant causes the leaf portion among leaf veins to be colored light-green, but with green leaf veins of the middle and upper leaves.

Similarly, it is also known that, if iron-deficiency disease is caused in the tomato plant, the color of an upper leaf would change from green to light green but with green leaf veins thereof in the beginning, and, thereafter, the color of the whole leaf would be light yellow green over the course of time.

In case of magnesium-deficiency disease, the color of the whole leaf will be turned to light green and white necrosis will be caused among leaf veins of lower leaves. Further, in the vicinity of fruits, the color of portions among leaf veins will be changed to yellow, and dark brown spots will be formed, so that the plant will be dead finally.

Further, in the case of manganese-overdose disease, the leaf veins of the lower leaves will be chocolate-colored and small spots with the same color will be produced among the leaf veins.

Therefore, with the above mentioned arrangement, by counting the R.G.B. values constituting colors of the picture elements from the color image of the leaf and subsequently calculating means of the R.G.B. values by the total numbers of picture elements, it is possible to detect the hues of the leaf.

It should be noted that, if an upward tendency or downward tendency of the R.G.B. values can be found at a glance, it would be easy to identify the above-mentioned symptoms for the plant. For example, FIG. 7A is a diagram exhibiting changes in leaf color as functions of the values of R.G.B. and the lightness values V in case of the manganese deficiency. Note that, in this experiment, the first day of the graph of FIG. 7A (pass days: 0) corresponds to a day when the standard hydroponic liquid is exchanged for the manganese-deficiency liquid intentionally.

In FIG. 7A, it is found that, due to the exchange for the manganese-defieciency liquid, the value R begins to rise after about 20 days, so that a mesh pattern, which is special to the manganese deficiency, appears on the leaf face clearly. Further, it is also found that, with a further rising of the value R after 28 days, the color of portions among leaf veins is remarkably turned to light-green.

FIG. 7B is a diagram exhibiting changes in leaf color as functions of the values of R.G.B. and the lightness values V in the case of the iron deficiency. Also in this experiment, the first day of the graph of FIG. 7B (pass days: 0) corresponds to a day when the standard hydroponic liquid is exchanged for the iron-deficiency liquid intentionally.

In FIG. 7B, it is found that, after about 30 days have passed since the first day, the value R begins to rise, so that the color of portions among leaf veins begins to change to light-green, while the color of the whole leaf begins to change to light yellow and green.

FIG. 8 is a diagram showing changes in the values of R.G.B. and the lightness values V in case of the manganese overdose. In FIG. 8, it is found that, after about 25 days have passed since the standard hydroponic liquid was exchanged for the manganese-overdose liquid, the value R begins to rise, so that the leaf veins of the lower leaves are changed to be chocolate-colored and there are produced small chocolate-colored spots among the leaf veins.

According to the embodiment, when a signal to detect hues of the whole leaf is inputted, both averages of the three primary colors R.G.B. of only one leaf of the plant and the lightness values V are calculated and stored as the hue values of the whole leaf, so that a graph is produced on a basis of the hue values and displayed. Consequently, by observing the changes in hue in the graph, an operator can grasp a variety of information early: what sort of diseases the plant is getting, which of the fertilizers is necessary or oversupplied for the plant, if the weather conditions is suitable for the plant, and how the plant should be treated.

On the other hand, when a signal to detect hues of the sick spots is inputted, the colors of leaf image are subtracted by the values within the three primary colors R.G.B. range for extracting the established sick spots portions and, thereafter, both averages of the three primary colors R.G.B. of the sick spots and the lightness values V are stored as the hue values of the sick spots. Then, by use of the hue data obtained in this way, a graph is produced and displayed. Consequently, by observing the changes in hue in the graph, the operator can grasp a variety of information remarkably: what sort of diseases the plant is getting, which of the fertilizers is necessary or oversupplied for the plant, if the weather conditions are suitable for the plant, and how the plant should be treated.

According to the embodiment, since the changes in lightness values V are also displayed as shown in FIGS. 7A, 7B and 8, it is possible for the operator to guess the past weather conditions under which the data were collected.

A Second Embodiment

Figure 9:
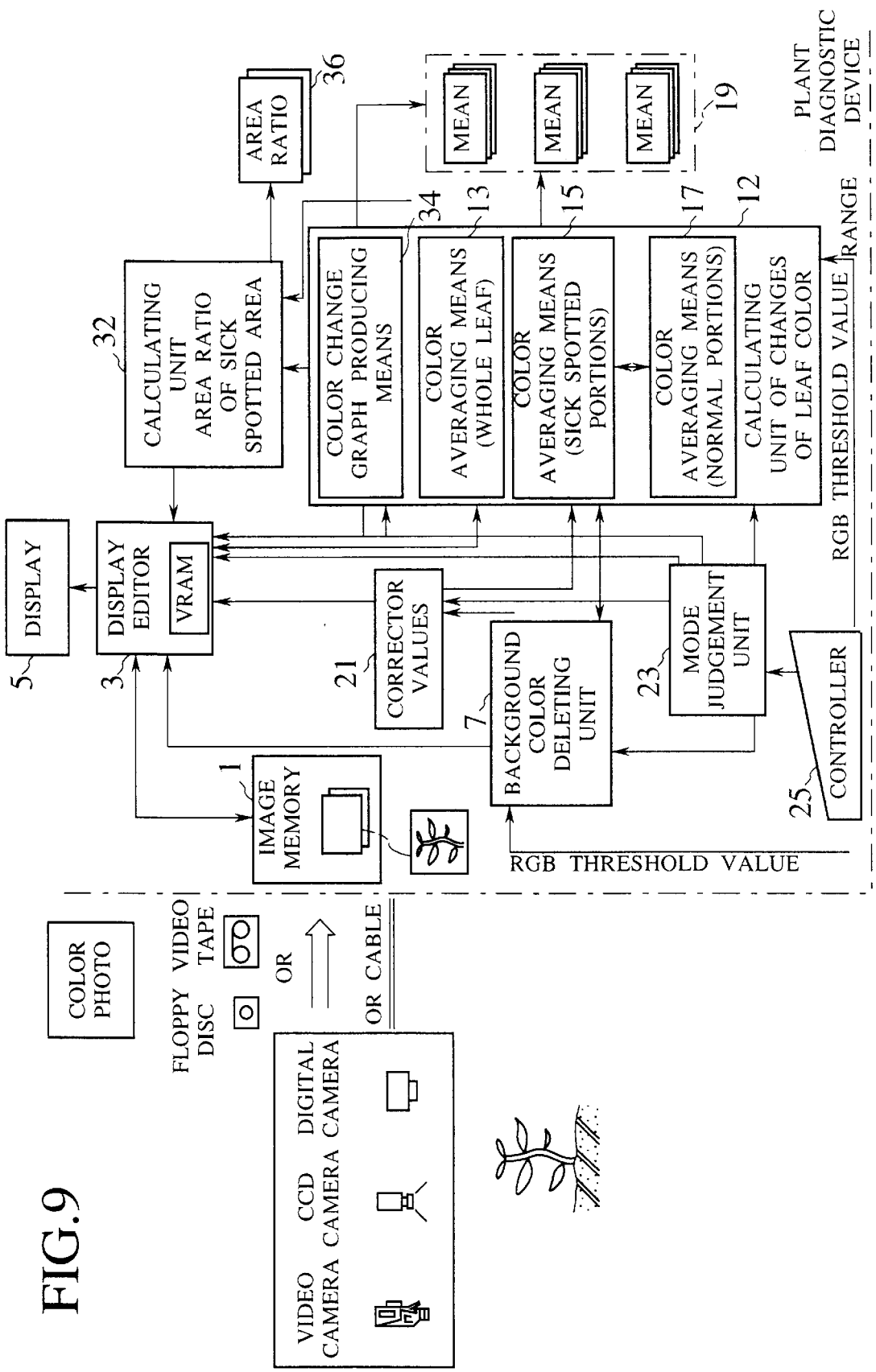
FIG. 9 is a block diagram showing a general structure of an automatic plant diagnostic device in accordance with a second embodiment of the present invention.

FIG. 9 shows a general structure of an automatic plant diagnostic device in accordance with the second embodiment of the present invention. In the figure, all the reference numerals 1 to 25 except for 12 designate the corresponding elements of FIG. 1. A leaf color-change calculating unit 12 comprises the total color averaging means 13, the sick-spotted portions' color averaging means 15, the normal portions' color averaging means 17 and a "color change graph" producing means 34.

Reference numeral 32 denotes an unit for calculating an area ratio of the sick spotted portions. Whenever the R.G.B. values of the sick spotted portions are counted in the leaf color-change calculating unit 12, the unit 32 operates to accumulate the numbers of counts and defines the resulting total counts as an area (square measure) of the sick spotted portions. Further, the unit 32 also accumulates numbers of counts of the whole leaf and defines the resulting total counts as an area of the whole leaf. The area ratio of the sick spotted portions can be obtained by calculating a ratio of the area of the sick spots to the area of the whole leaf. The resulting area ratio is stored in a memory 36 for every date and entered in VRAM of the display editor 3 for displaying.

In displaying the RGBV graph, the color change graph producing means 34 controls the area ratio calculating unit 32 so as to allow the past area ratios of sick spots on memory to be displayed.

The plant diagnostic device in accordance with the second embodiment operates as follows.

Figure 10:
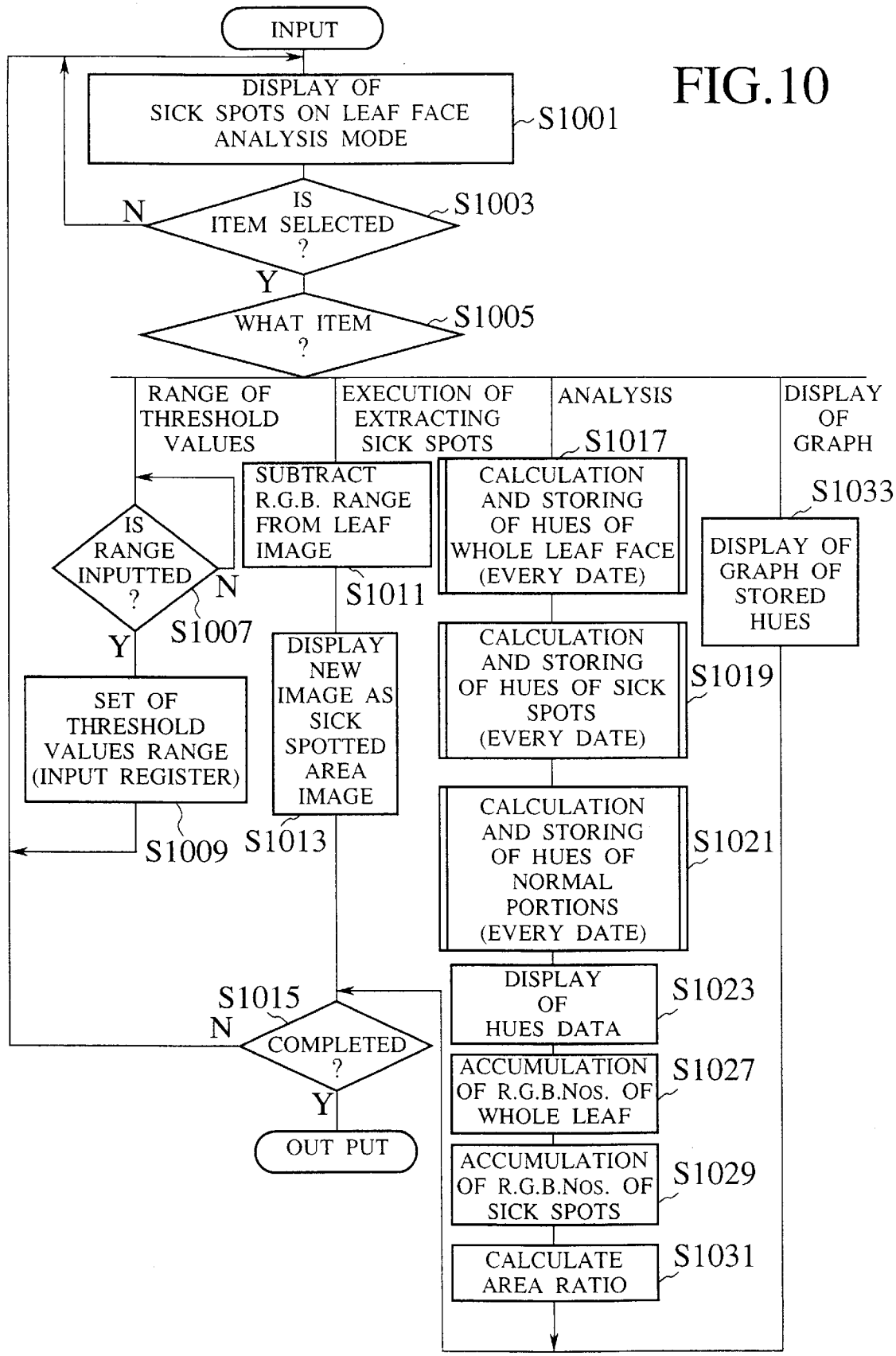
FIG. 10 is a flow chart to execute an operation of a "changes in leaf color" calculating unit of FIG. 9.

FIG. 10 is a flow chart of the operations of the device. As shown in the figure, processes of steps S1001 through S1023 are similar to those of steps S501 through S523 of FIG. 5, respectively. That is, when the R.G.B. threshold values ranges of the sick spotted portions are established, not only does the leaf color-change calculating unit 12 operate to calculate the respective means of R.G.B. values in the whole leaf, the sick spotted portions and the normal portions, but the unit 12 stores and displays the respective means of R.G.B. values, deleting the background color.

In this way, providing that the respective means of R.G.B. values are displayed, the routine goes to step S1027 where the area ratio calculating unit 32 counts the means of R.G.B. values of the whole leaf calculated by the total color averaging means 13 and accumulates them. Further, when the means of R.G.B. values of the sick spotted portions are counted, the unit 32 operates to accumulate the means at step S1029. At subsequent step S1031, a ratio of the latter accumulation to the former accumulation is calculated by the unit 32. Then, the ratio is displayed as the ratio of the sick spotted portions as shown in FIG. 11 and stored in the memory 36.

Figure 12A:
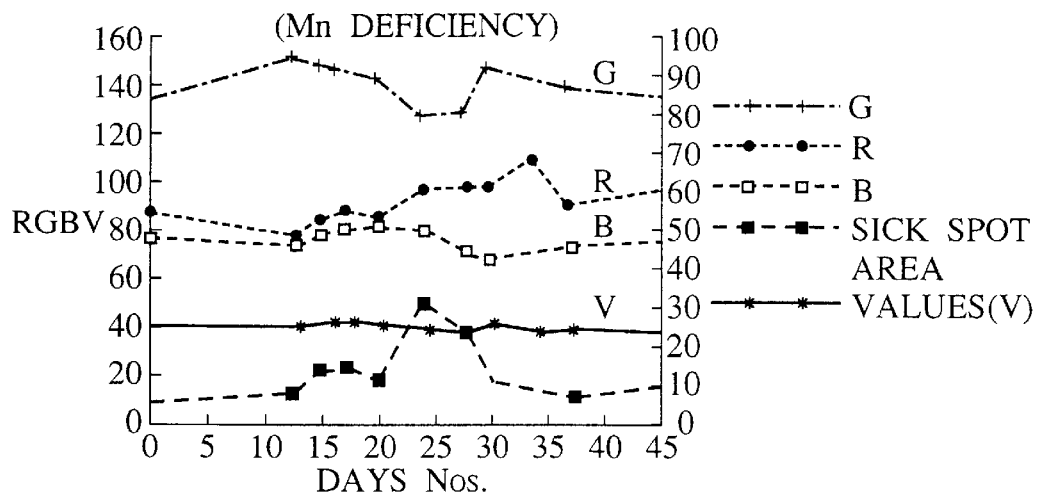
FIGS. 12A, 12B and 12C are graphs showing RGBV and area changes in Mn deficiency, Fe deficiency and Mn overdose, respectively.
Figure 12B:
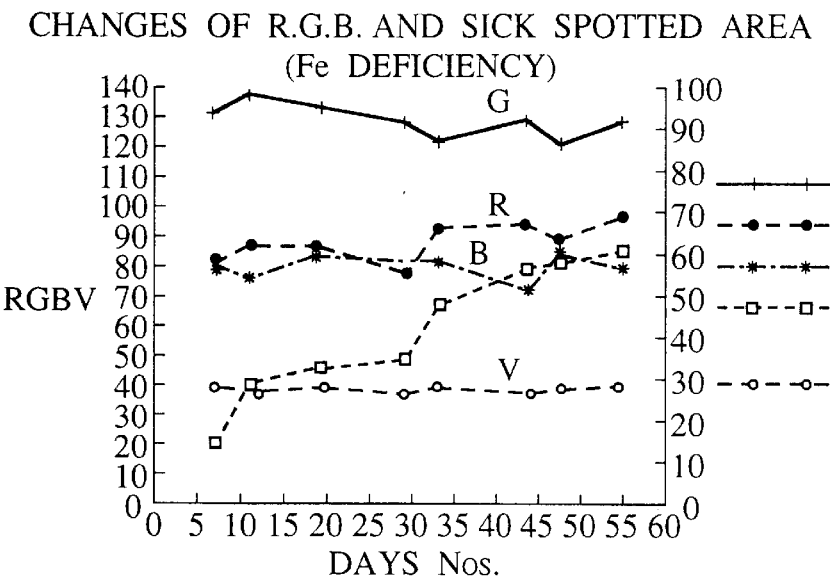
Figure 12C:
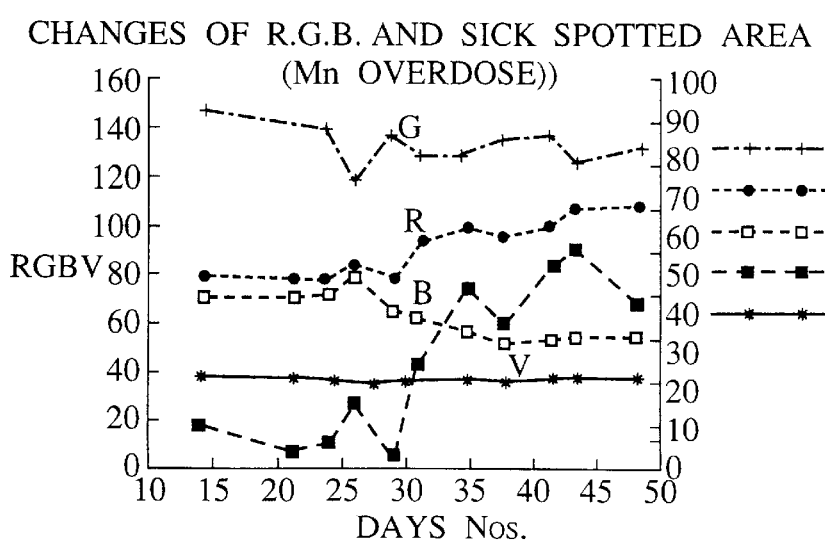

On the other hand, when the item for displaying the graph is selected, the routine goes to step S1033 where the color change graph producing means 34 reads both of the changes in RGBV stored in the memory 19 and the changes in area ratio stored in the memory 36 and outputs signals to display such diagrams as shown in FIGS. 12A, 12B and 12C.

In the figures, FIG. 12A shows both changes in terms of the R.G.B. values of the sick spotted portions in the manganese deficiency and the area of the sick spotted portions, FIG. 12B shows both changes in terms of the R.G.B. values of the sick spotted portions in the iron-deficiency and the area of the sick spotted portions, and FIG. 12C shows both changes in terms of the R.G.B. values of the sick spotted portions in the manganese-dosage and the area of the sick spotted portions, respectively. Note that, the first day of the graph of FIG. 12A (DAYS Nos.: 0) corresponds to a day when the standard hydroponic liquid is exchanged for the manganese-deficiency liquid intentionally.

In FIG. 12A, it is found that the area of sick spotted portions begins to increase since about 15 days have passed.

Similarly, it is also found that, in FIG. 12B, both the value R and the area of sick spotted portions begin to increase after about 30 days have passed and that, in FIG. 12C, the value R begins to increase and the value B begins to decrease after about 25 days have passed.

Accordingly, when a signal to detect either hues of the whole leaf or hues of the sick spotted portions is inputted, it is possible to grasp both the changes in hues and the progressive condition of the sick spots at a glance and in its early stages by calculating and storing the area ratio of the sick spotted portions to the whole leaf and subsequently displaying the stored graph of the area ratio up to the time of the most recent measurement of the leaf together with the graph of sick spotted portions or the graph of the whole leaf.

In addition, according to the embodiment, since the increasing or decreasing tendency of the areas and the changes in R.G.B and lightness values V can be easily found by the graphs, it is possible for the operator to grasp the relationship between the values V and the degree of damage.

A Third Embodiment

Figure 13:
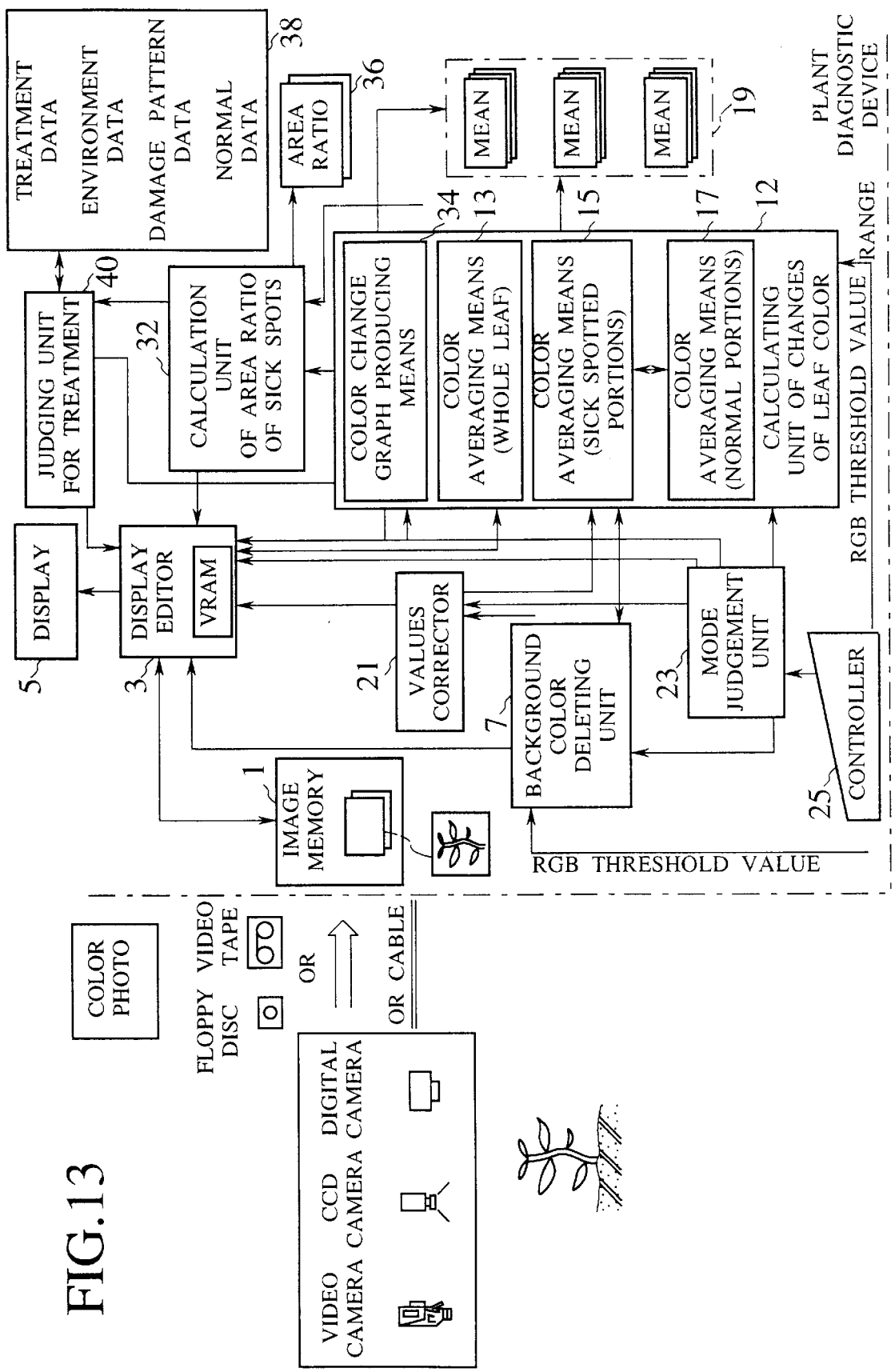
FIG. 13 is a block diagram showing a general structure of an automatic plant diagnostic device in accordance with a third embodiment of the present invention.

FIG. 13 shows a general structure of an automatic plant diagnostic device in accordance with the third embodiment of the present invention. In the figure, elements shown with reference numerals 1 to 34 are similar to those elements of FIG. 9. In FIG. 13, reference numeral 38 denotes a database which contains environmental pH (potential of hydrogen) data, damage-pattern data on each plant in the case that the fertilizer is oversupplied or lacking, treatment data or the like.

Reference numeral 40 designates I a "sickness and treatment" judging unit for judging types of sicknesses and the treatments. Reading both respective RGBV changes of the parts in the color change graph producing means 34 and the area ratio changes calculated by the area ratio calculating unit 32, the unit 40 serves to specify the sort of sickness by examining data and matching it with respective data in the database 38 and selecting a message for treatment in response to the specified sickness. Further, the unit 40 operates to write the selected message in the VRAM of the display editor 3 thereby displaying it.

The plant diagnostic device in accordance with the third embodiment operates as follows.

Figure 14:
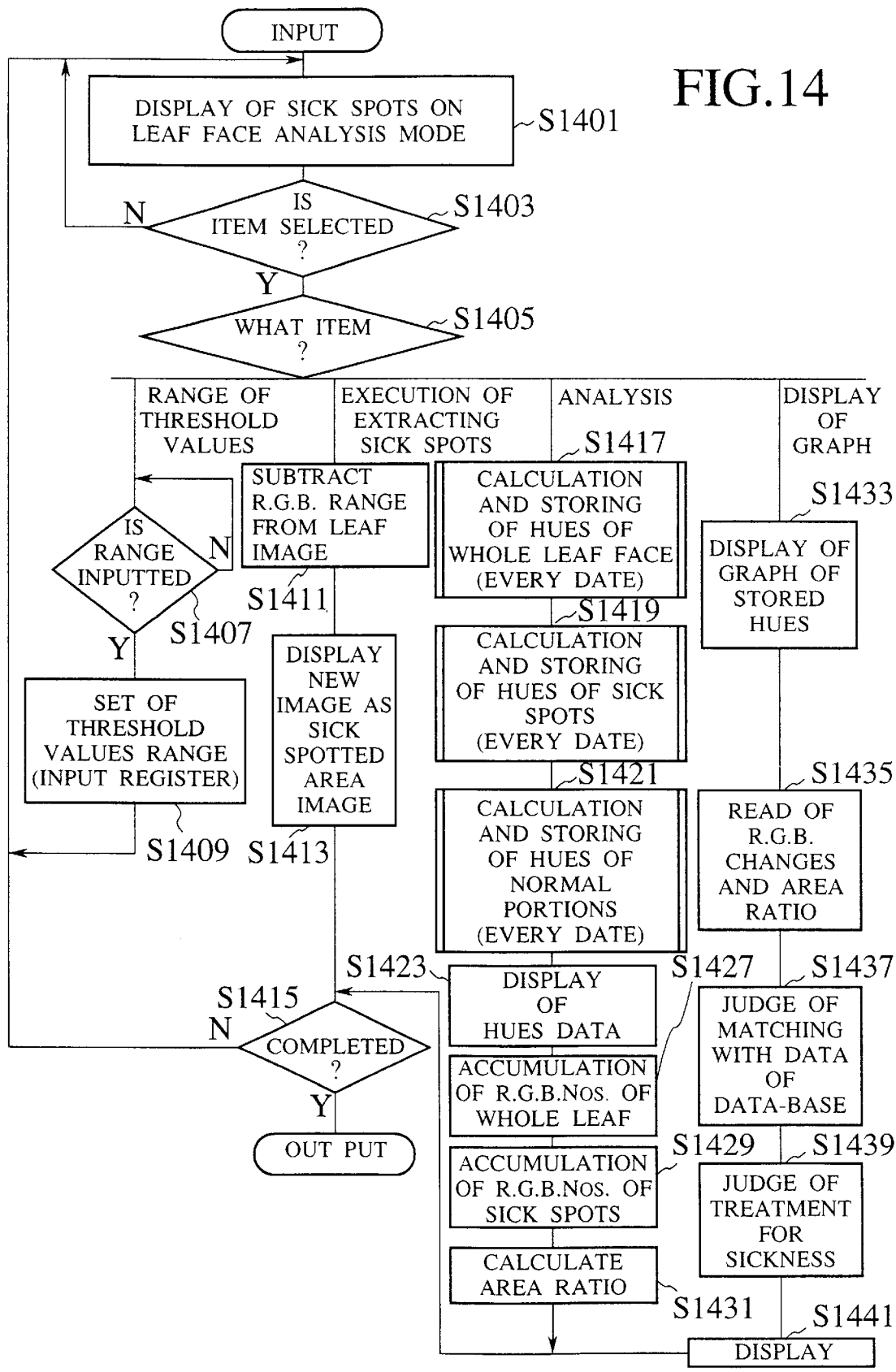
FIG. 14 is a flow chart to execute an operation of a "changes in leaf color" calculating unit of FIG. 13.
Figure 15:
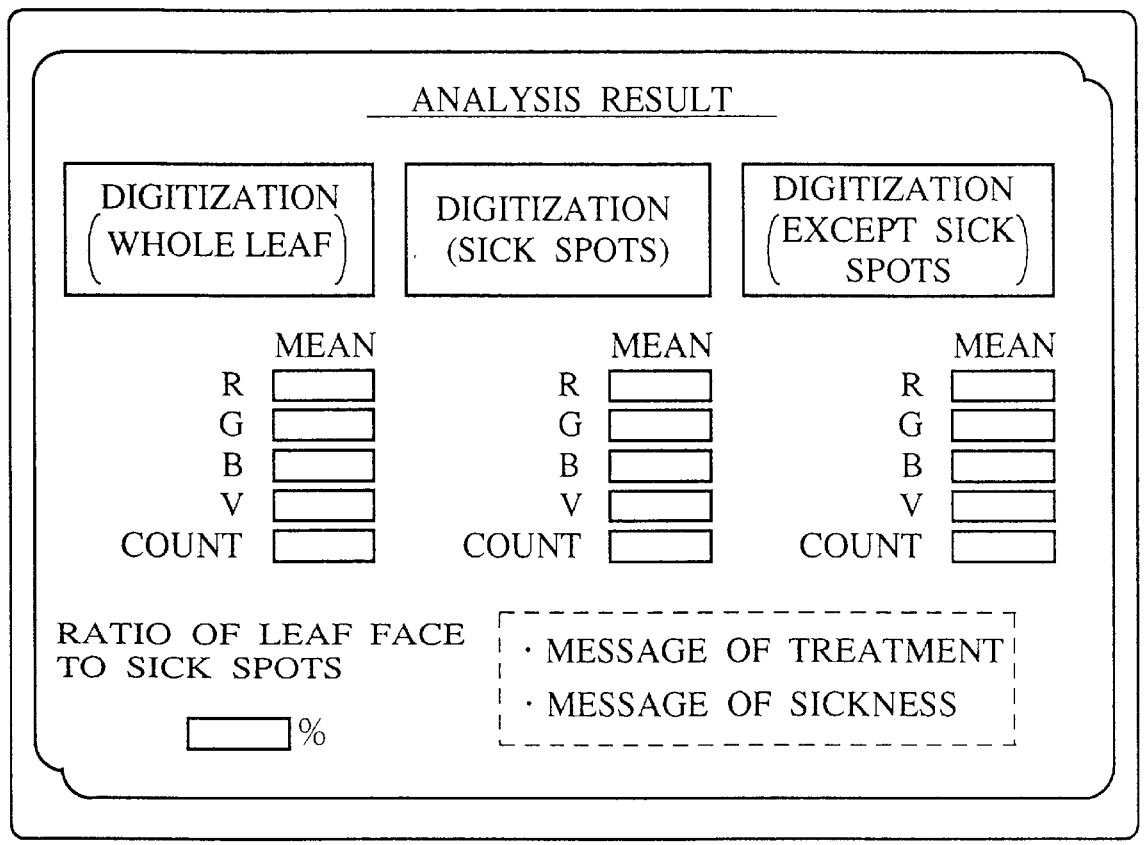
FIG. 15 is an explanatory diagram showing an example of an "analysis result" picture of the third embodiment.

FIG. 14 is a flow chart of the operations of the device. As shown in the figure, processes of steps S1401 through S1433 are similar to those of steps S1001 through S1033 of FIG. 10, respectively. When the R.G.B. threshold values ranges of the sick spotted portions are established upon deleting the background color, not only does the leaf color-change calculating unit 12 operate to calculate the respective means of R.G.B. values in the whole leaf, the sick spotted portions and the normal portions, but the unit 12 stores and displays the respective means of R.G.B. values. Further, the unit 12 also calculates the area ratio of the sick spotted portions to the whole leaf and outputs signals for displaying the resulting area ratio graph besides the RGBV graph when it is commanded to display the graphs.

Then, at step S1435, the sickness and treatment judging unit 40 operates to read the respective RGBV changes of the whole leaf and the sick spotted portions calculated by the unit 12 and the area ratio changes calculated by the area ratio calculating unit 32 and, thereafter, the routine goes to step S1437.

At step S1437, it is judged how the changes obtained at step S1435 will match with the respective data on the database 38, that is, the so-called "matching degree" of each change is examined.

Subsequent step S1439, based on the respective matching degrees, specifies the type of sickness and selects the message for treatment in response to the specified sickness and the routine goes to step S1411, where the results at step S1439 are displayed as the message.

In this way, according to the embodiment, it is possible for even a beginner to find what causes a disease of the plant at present and which treatment it immediately requires.

Although the image memory 1 is arranged inside a personal computer in common with the above mentioned embodiments, it may be outside the computer.

Finally, it will be understood by those skilled in the art that the foregoing description is one of preferred embodiments of the disclosed key plate structure, and that various changes and modifications may be made to the present invention without departing from the spirit and scope thereof.

What is claimed is:

1. An automatic plant diagnostic method comprising steps of:

reading a color image of a plant to be taken and subsequently extracting a leaf image thereof from said color image of said plant;

counting numbers of colors of each of a plurality of picture elements forming said leaf image extracted in sequence and accumulating said numbers of colors;

processing said accumulated numbers of colors by total numbers of said picture elements thereby obtaining hues of said leaf and subsequently storing said hues in correspondence with a time when said extracting step is executed;

displaying both said hues stored at this time and other hues stored in the past in a first display form; and wherein said leaf image to be extracted in said extracting step is a sick spotted portion of a whole leaf.

2. An automatic plant diagnostic method as claimed in claim 1, wherein said first display form includes a graph in which said extracting time corresponds to said hues.

3. An automatic plant diagnostic method as claimed in claim 1, wherein said hues are composed of respective values of R.G.B. (Red, Green and Blue).

4. An automatic plant diagnostic method as claimed in claim 1, wherein said hues are composed of respective values of R.G.B. (Red, Green and Blue) and lightness values V.

5. An automatic plant diagnostic method comprising steps of:

reading a color image of a plant to be taken and subsequently extracting a leaf image thereof from said color image of said plant;

counting numbers of colors of each of a plurality of picture elements forming said leaf image extracted in sequence and accumulating said numbers of colors;

processing said accumulated numbers of colors by total numbers of said picture elements thereby obtaining hues of said leaf and subsequently storing said hues in correspondence with a time when said extracting step is executed;

further extracting an image of normal portions of said leaf and an image of sick spotted portions thereof when said color image is read;

calculating an area ration of said normal portions to said sick spotted portions by respective numbers of picture elements contained in said normal portions and said sick spotted portions and subsequently storing said area ratio in correspondence with said time; and displaying both said hues stored at this time and other hues stored in the past in a second display form and displaying both said area ratio stored at this time and another area ratio stored in the past in said second display form.

6. An automatic plant diagnostic method as claimed in claim 5, wherein said second display form includes a graph in which said extracting time, said hues and said area ratio correspond to each other.

7. An automatic plant diagnostic method as claimed in claim 5, wherein said leaf image to be extracted in said extracting step is constituted by any one of respective images of a whole leaf, said sick spotted portions and said normal portions.

8. An automatic plant diagnostic method as claimed in claim 5, wherein said hues are composed of respective values of R.G.B. (Red, Green and Blue).

9. An automatic plant diagnostic method as claimed in claim 5, wherein said hues are composed of respective values of R.G.B. (Red, Green and Blue) and lightness values V.

10. An automatic plant diagnostic device comprising:
a manipulating unit manipulated by an operator;
a display;
an image memory for reading color image data of a plant and storing said color image data every taking date, said image memory subsequently reading said color image data on every taking date and converting said color image data into color video signals thereby allowing said display to display said color image;
a background color deleting unit for deleting background colors of said color image by subtracting three established primary colors from said color image displayed on said display thereby obtaining a leaf image of said plant;
a color-change calculating unit for measuring both three primary colors values and lightness values of each of a plurality of picture elements forming said leaf image when it is commanded to detect hues of said leaf image and subsequently averaging said three primary color values and said lightness values by numbers and said picture elements, said calculating unit further storing respective means of said values as parameters representing said hues on every taking date, and making graphs on a basis of said respective means thereby to output graph signals to said display;
a mode judgement unit having respective judgement data installed therein, said mode judgement unit activating said image memory, said background color deleting unit and said color-change calculating unit on a basis of said respective judgement data when said manipulating unit is operated;
wherein, in case that it is commanded to detect hues of sick spotted portions of said leaf, said color-change calculating unit subtracts values, which are within three primary colors ranges predetermined for extracting said sick spotted portions, from colors of said leaf image;
wherein said color-change calculating unit further counts total numbers of picture elements forming said sick spotted portions and respective distribution numbers in three primary colors and a lightness value for each of said picture elements: and averages said respective distribution numbers by said total numbers of picture elements thereby obtaining respective means; and
wherein said color-change calculating unit stores said respective means of said three primary colors and lightness values as parameters representing hues of said sick spotted portions.

11. An automatic plant diagnostic device comprising:
a manipulating unit manipulated by an operator;
a display;
an image memory for reading color image data of a plant and storing said color image data every taking date, said image memory subsequently reading said color image data on every taking date and converting said color image data into color video signals thereby allowing said display to display said color image;
a background color deleting unit for deleting background colors of said color image by subtracting three established primary colors from said color image displayed on said display thereby obtaining a leaf image of said plant;
a color-change calculating unit for measuring both three primary colors values and lightness values of each of a plurality of picture elements forming said leaf image when it is commanded to detect hues of said leaf image and subsequently averaging said three primary color values and said lightness values by numbers and said picture elements, said calculating unit further storing respective means of said values as parameters representing said hues on every taking date, and making graphs on a basis of said respective means thereby to output graph signals to said display;
a mode judgement unit having respective judgement data installed therein, said mode judgement unit activating said image memory, said background color deleting unit and said color-change calculating unit on a basis of said respective judgement data when said manipulating unit is operated; and
an area ratio change calculating unit for calculating changes an area ratio of sick spotted portions;
wherein, providing that it is commanded to calculate an area ratio of said sick spotted portions to a whole leaf and that hues of said whole leaf and hues of said sick spotted portions are calculated, said area ratio change calculating unit operates to store a ratio of said hues of said whole leaf to said hues of said sick spotted portions as said area ratio of said sick spotted portions on every taking date; and
wherein said area ratio change calculating unit further makes a graph representing said area ratio of said sick spotted portions and outputs graph signals to said display when either one of said graphs is displayed.

12. An automatic plant diagnostic device comprising:
a manipulating unit manipulated by an operator;
a display;
an image memory for reading color image data of a plant and storing said color image data every taking date, said image memory subsequently reading said color image data on every taking date and converting said color image data into color video signals thereby allowing said display to display said color image;
a background color deleting unit for deleting background colors of said color image by subtracting three established primary colors from said color image displayed on said display thereby obtaining a leaf image of said plant;
a color-change calculating unit for measuring both three primary colors values and lightness values of each of a plurality of picture elements forming said leaf image when it is commanded to detect hues of said leaf image and subsequently averaging said three primary color values and said lightness values by numbers and said picture elements, said calculating unit further storing respective means of said values as parameters representing said hues on every taking date, and making graphs on a basis of said respective means thereby to output graph signals to said display;

a mode judgement unit having respective judgement data installed therein, said mode judgement unit activating said image memory, said background color deleting unit and said color-change calculating unit on a basis of said respective judgement data when said manipulating unit is operated; and a damage-treatment judging unit for outputting messages of damage conditions and treatments for said plant to said display on a basis of either one of a combination composed of said hue graph of said whole leaf and an area ratio and another combination composed of said hue graph of sick spotted portions and said area ratio.

* * * * *